A. TURNBULL.
WEIGHING-SCALES.
No. 193,576.
Patented July 24, 1877.
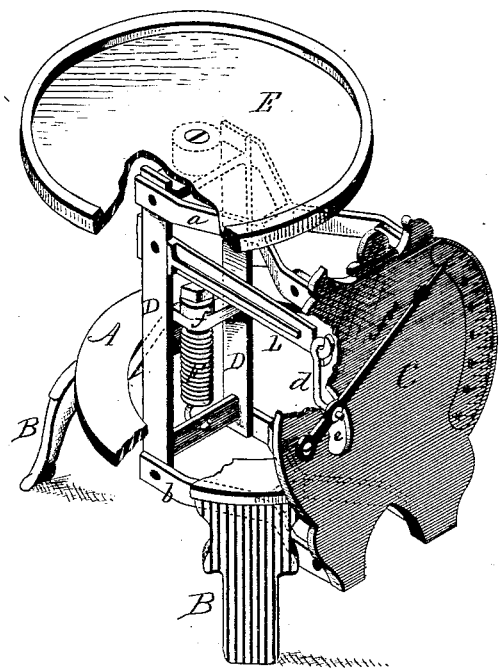

UNITED STATES PATENT OFFICE.

ANDREW TURNBULL, OF NEW BRITAIN, CONNECTICUT, ASSIGNOR TO LANDERS, FRARY & CLARK, OF SAME PLACE.

IMPROVEMENT IN WEIGHING-SCALES.

Specification forming part of Letters Patent No. 193,576, dated July 24, 1877; application filed June 30, 1877.

*To all whom it may concern:*

Be it known that I, ANDREW TURNBULL, of New Britain, in the county of New Haven and State of Connecticut, have invented new Weighing-Scales; and I do hereby declare the following, when taken in connection with the accompanying drawings and the letters of reference marked thereon, to be a full, clear, and exact description of the same, and which said drawings constitute part of this specification, and represent, in perspective view, parts broken to better illustrate the invention.

This invention relates to an improvement in that class of weighing-scales commonly called "counter-scales," and particularly to that class which denote the weight by an index, and in which the support is vertical and guided by parallel bars.

In this class the pointer is usually actuated by a rack attached to the movable part of the scale, working into a pinion on the shaft of the index or pointer. In such an arrangement it is very difficult to properly connect the rack and pinion without so much and variable friction as to make this class of scales objectionable, and especially is this the case in the cheaper class of scales, in which it is practically impossible to devote the necessary labor to so perfectly fit the rack and pinion.

The object of this invention is to produce an exceedingly cheap and accurate scale; and it consists in connecting the index or pointer by a rod directly to the vertically-moving support, and jointed to said support and pointer, as more fully hereinafter described.

A represents the base, which here consists of a ring resting on legs B; C, the dial, rigidly attached to the base; D D, two vertical posts, which form the vertical support, and on which rests the platform E, or may be the pan, according to the use of the scale.

The posts are in a plane parallel to the dial, and to them is hinged a pair of parallel bars, *a b*, the said bars extending forward to corresponding points in the rear of the dial, where they are hinged in like manner, forming guides to sustain the parts D in their proper vertical position as they move up and down, and substantially as in the usual construction of this class of scales.

F is the spring, which is hinged at its upper end to an arm, *f*, extending from the base, and connected to the posts at its lower end, so that whatever is placed on the platform will draw down upon the spring in the usual manner.

From one of the posts D, or other movable part of the machine, a rigid arm extends forward, and to this arm one end of the connecting-rod *d* is hung, and the other end extends through a slot, *e*, in the dial, and hinged to the pointer *f'* forward of the pivot; hence the depression and rise of the posts will correspondingly turn the pointer, which will indicate on the dial the extent of the depression.

This connecting-rod requires no guide or friction to make its connection with the pointer, and as the joints are substantially frictionless, or a constant friction, it follows that the scale will weigh with uniformity, and, once set accurate, will remain so.

I claim—

In combination, the vertically-guided support of a weighing-scales, spring-dial, and pointer, a connection-rod positively joining the said pointer to the vertically-moving part of the mechanism, substantially as described.

ANDREW TURNBULL.

Witnesses:
T. W. HYDE,
T. B. HARPER.